US012457440B2

(12) United States Patent
Jang et al.

(10) Patent No.: US 12,457,440 B2
(45) Date of Patent: Oct. 28, 2025

(54) WIRELESS EARPHONES

(71) Applicant: AMOSENSE CO., LTD., Cheonan-si (KR)

(72) Inventors: Kiljae Jang, Cheonan-si (KR); Wonsan Na, Cheonan-si (KR); Kyunghyun Ryu, Cheonan-si (KR)

(73) Assignee: AMOSENSE CO., LTD., Cheonan-si (KR)

( * ) Notice: Subject to any disclaimer, the term of this patent is extended or adjusted under 35 U.S.C. 154(b) by 229 days.

(21) Appl. No.: 18/275,783

(22) PCT Filed: Jan. 24, 2022

(86) PCT No.: PCT/KR2022/001186
§ 371 (c)(1),
(2) Date: Aug. 3, 2023

(87) PCT Pub. No.: WO2022/169150
PCT Pub. Date: Aug. 11, 2022

(65) Prior Publication Data

US 2024/0121546 A1 Apr. 11, 2024

(30) Foreign Application Priority Data

Feb. 4, 2021 (KR) ........................ 10-2021-0015819

(51) Int. Cl.
*H04R 1/10* (2006.01)
*H01Q 5/25* (2015.01)
(Continued)

(52) U.S. Cl.
CPC ............. *H04R 1/1016* (2013.01); *H01Q 5/25* (2015.01); *H01Q 5/28* (2015.01); *H02J 50/005* (2020.01);
(Continued)

(58) Field of Classification Search
CPC ........ A41D 20/00; H04R 1/08; H04R 1/1008; H04R 1/1041; H04R 1/105; H04R 1/1075;
(Continued)

(56) References Cited

U.S. PATENT DOCUMENTS

2007/0115178 A1* 5/2007 Chi ........................ H01Q 1/243
343/700 MS
2016/0118179 A1* 4/2016 Park ........................ H01F 38/14
320/108
(Continued)

FOREIGN PATENT DOCUMENTS

CN 112040361 A 12/2020
KR 10-2014-0099822 A 8/2014
(Continued)

OTHER PUBLICATIONS

KR Office Action dated Mar. 28, 2023 as received in Application No. 10-2022-0009677.
(Continued)

*Primary Examiner* — Oyesola C Ojo
(74) *Attorney, Agent, or Firm* — Maschoff Brennan

(57) ABSTRACT

Provided is a wireless ear module having a UWB antenna to easily obtain location information of a wireless ear module case and ear modules. The wireless ear module comprises: ear modules for receiving and playing a sound source signal from an electronic device; and a case comprising an upper housing and a lower housing which are rotatably coupled, and for storing the ear modules. The ear modules and/or the case transmit a location positioning signal, and the location positioning signal is a signal for sensing the distance and direction from the electronic device to the ear modules or the case.

12 Claims, 9 Drawing Sheets

(51) Int. Cl.
*H01Q 5/28* (2015.01)
*H02J 50/00* (2016.01)
*H02J 50/10* (2016.01)

(52) U.S. Cl.
CPC ............ *H02J 50/10* (2016.02); *H04R 1/1025* (2013.01); *H04R 2420/07* (2013.01); *H04R 2460/07* (2013.01)

(58) Field of Classification Search
CPC .... H04R 2420/07; H04R 5/02; H04R 25/402; H04R 25/60; H04R 25/606; H04R 25/658; H04R 2201/023; H04R 2225/77; H04R 2460/13; H04R 5/0335
See application file for complete search history.

(56) References Cited

U.S. PATENT DOCUMENTS

| | | | | |
|---|---|---|---|---|
| 2018/0175670 | A1* | 6/2018 | Hidaka | H02J 50/90 |
| 2018/0277123 | A1* | 9/2018 | Boesen | H04R 1/1041 |
| 2020/0068286 | A1* | 2/2020 | Schrems | H04R 1/1016 |
| 2021/0320417 | A1* | 10/2021 | Lee | H01Q 21/065 |
| 2022/0224167 | A1 | 7/2022 | Jang | |

FOREIGN PATENT DOCUMENTS

| | | | |
|---|---|---|---|
| KR | 10-1518010 | B1 | 5/2015 |
| KR | 10-2020-0055958 | A | 5/2020 |
| KR | 10-2021-0002004 | A | 1/2021 |

OTHER PUBLICATIONS

KR Decision to Grant Dated May 31, 2023 as received in Application No. 10-2022-0009677.

* cited by examiner

[FIG. 1]
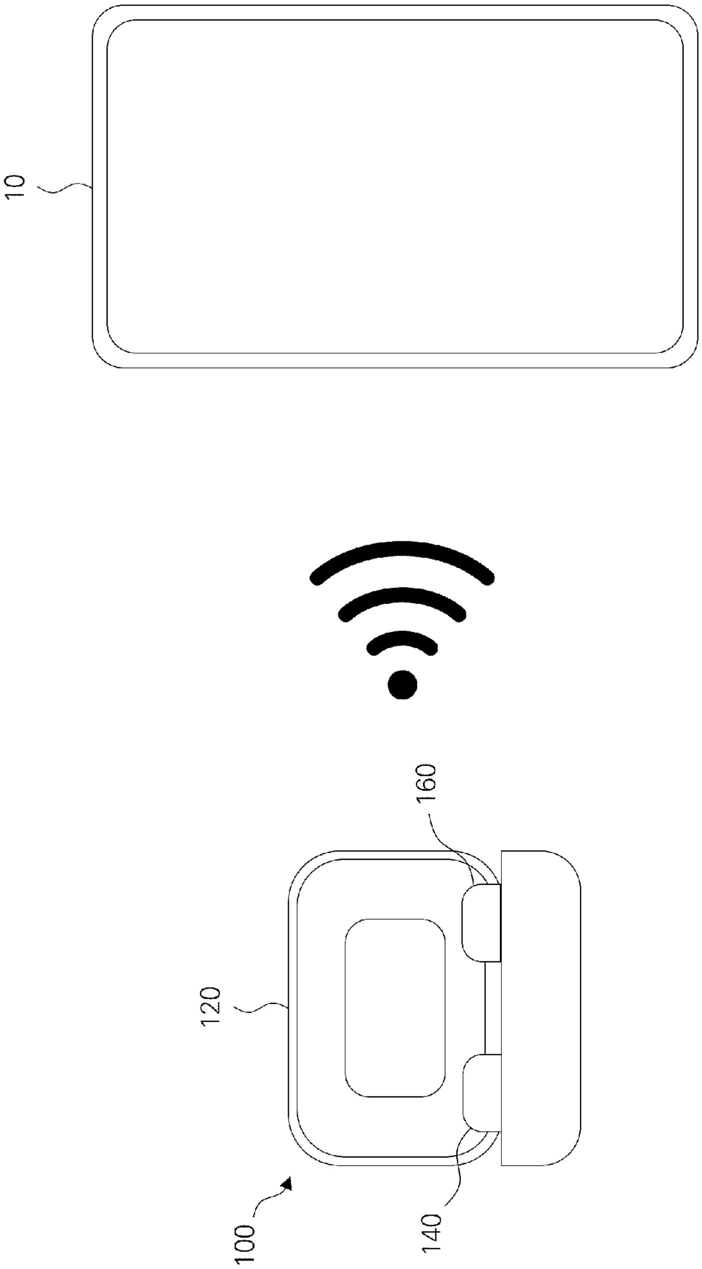

[FIG. 2]
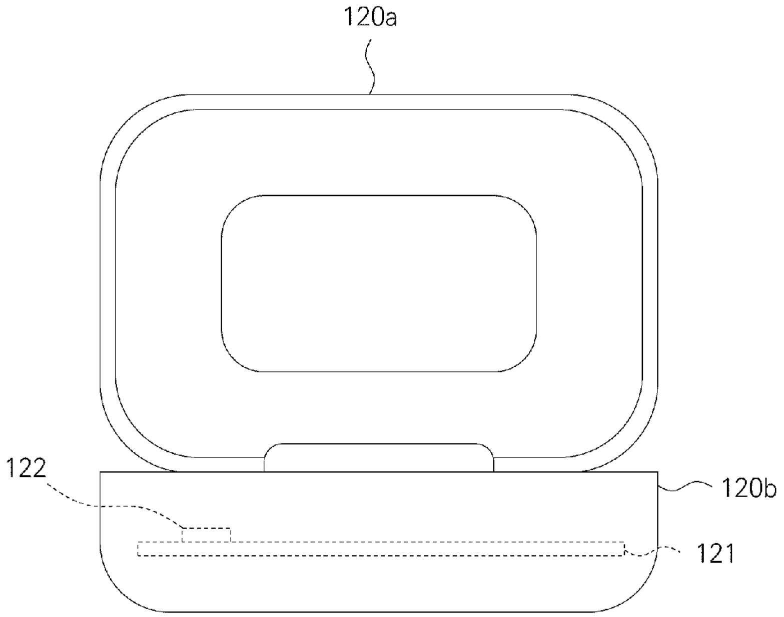
[FIG. 3]
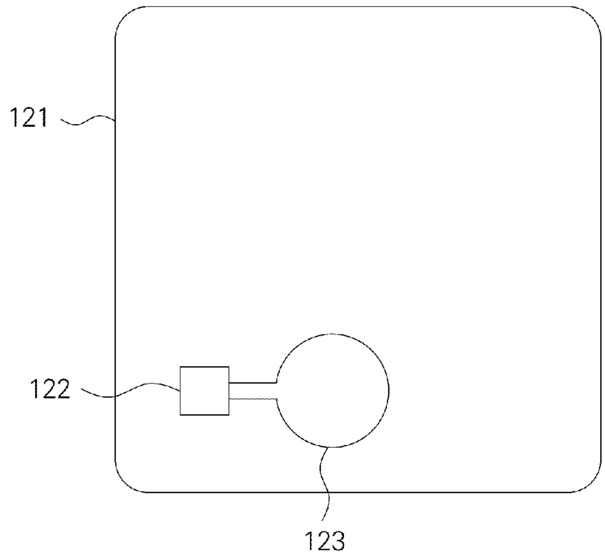

[FIG. 4]
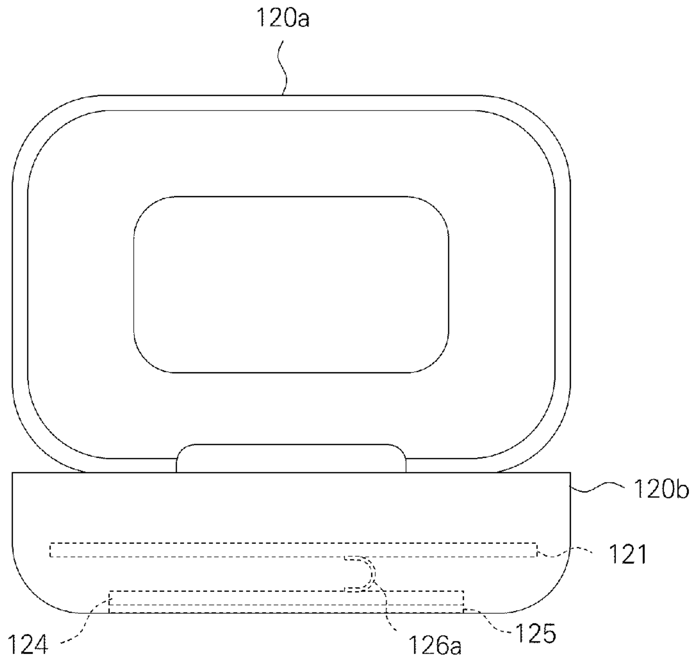
[FIG. 5]
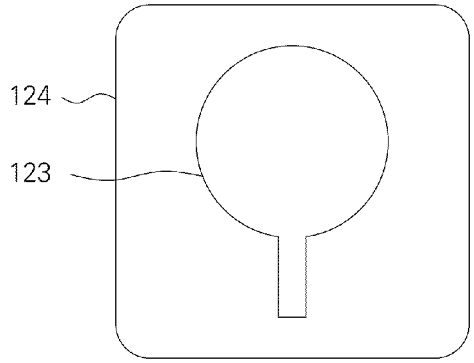

[FIG. 6]
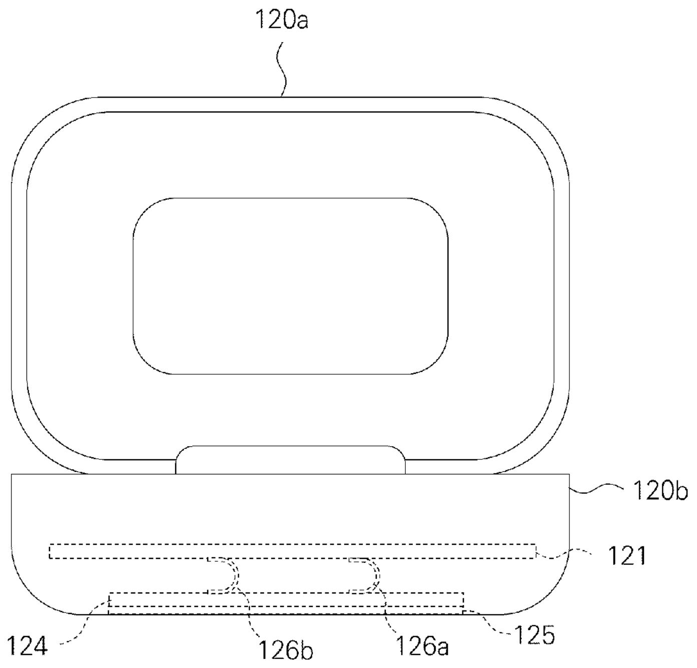
[FIG. 7]
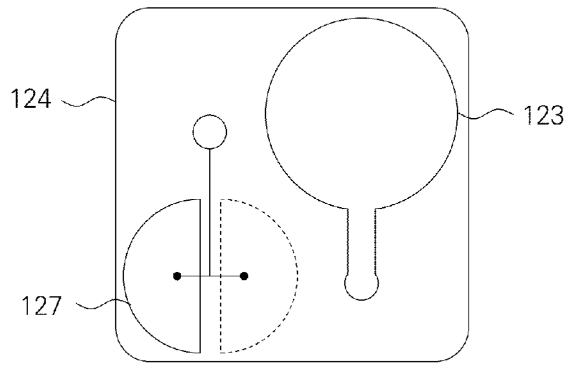

[FIG. 8]
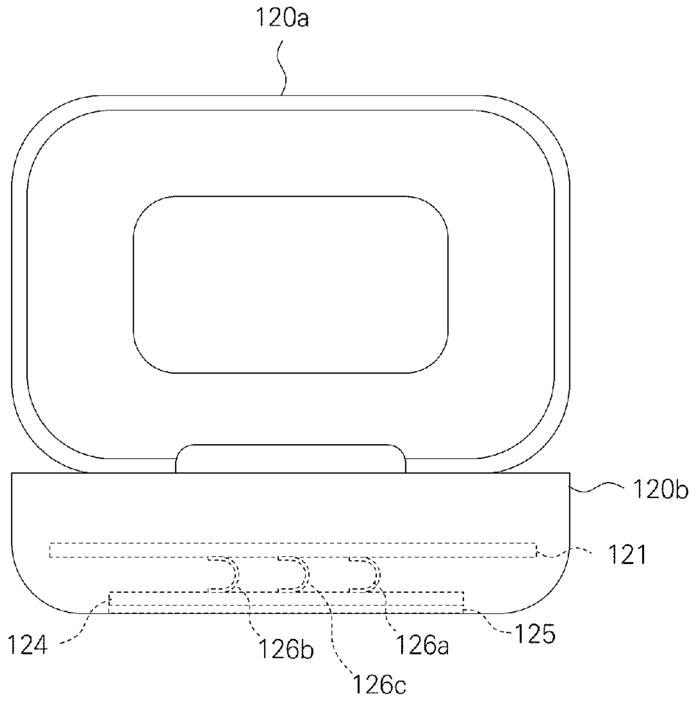
[FIG. 9]
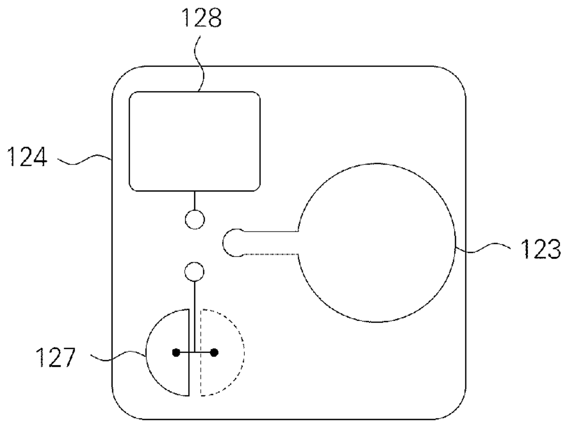

[FIG. 10]
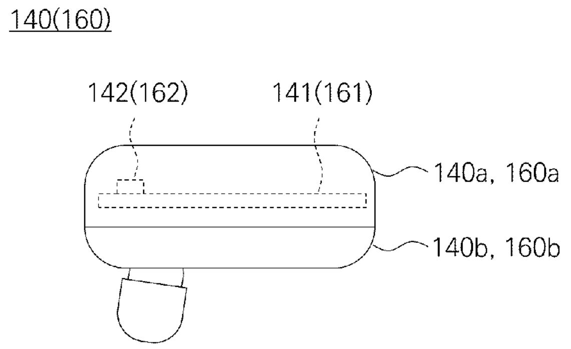
[FIG. 11]
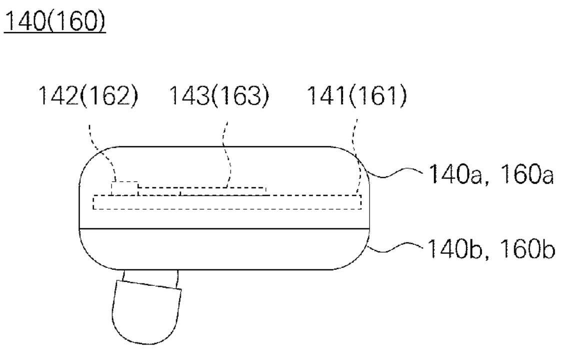
[FIG. 12]
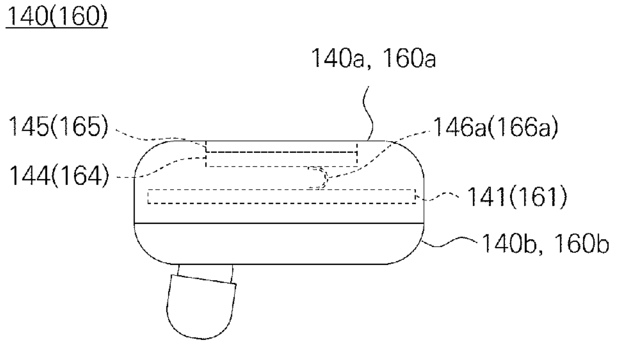

[FIG. 13]
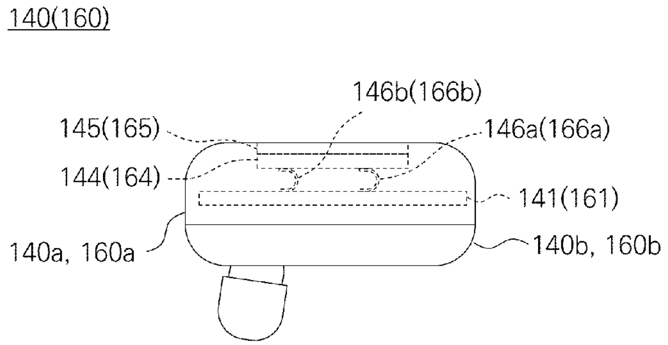
[FIG. 14]
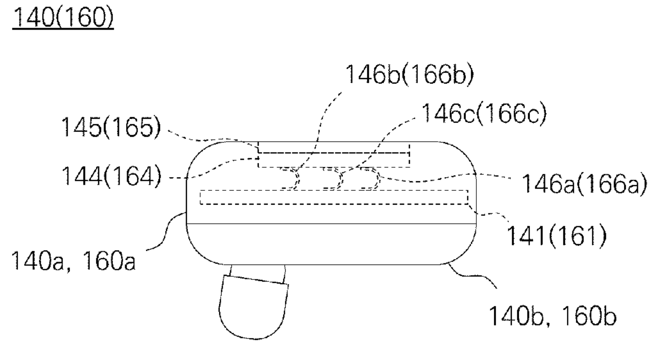

[FIG. 15]
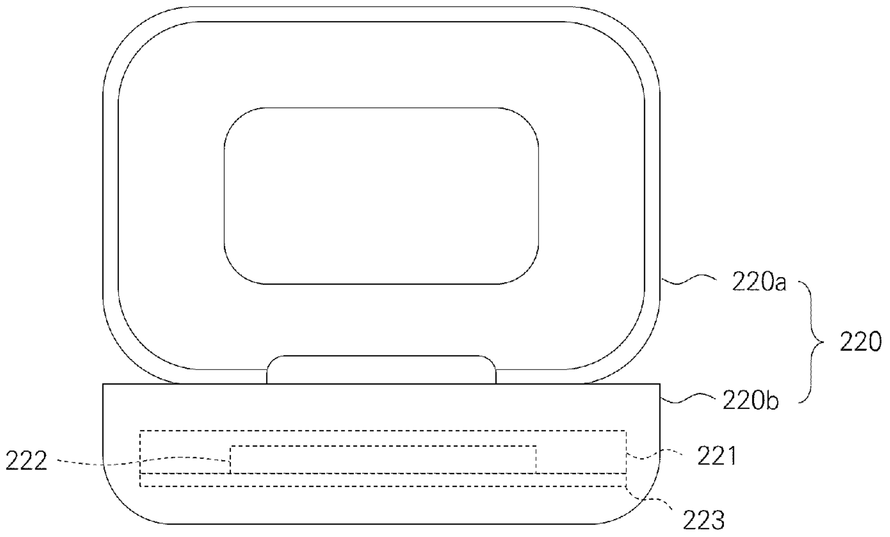
[FIG. 16]
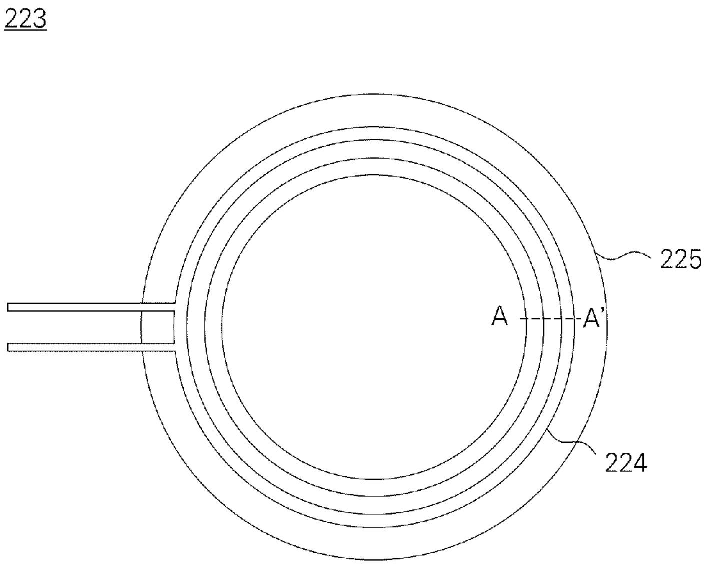

[FIG. 17]
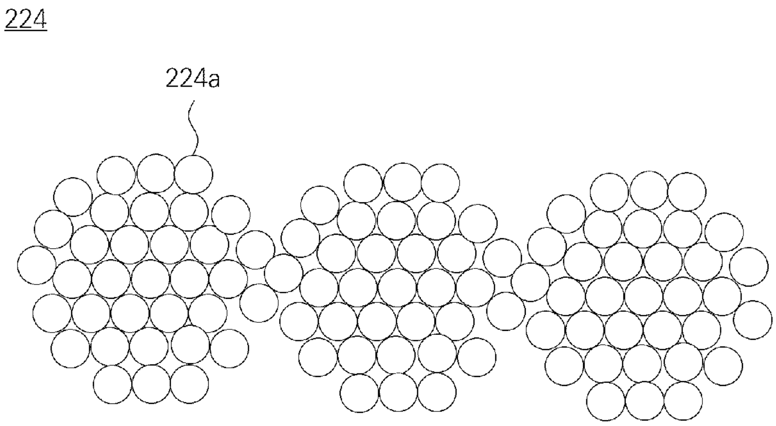

WIRELESS EARPHONES

TECHNICAL FIELD

The present disclosure relates to a wireless earphone, and more specifically, to a truly wireless stereo (TWS) earphone wirelessly connected to electronic devices such as a smartphone and a laptop computer to output sounds output from the electronic devices.

BACKGROUND ART

An earphone is a device connected to an electronic device such as a smart phone or a laptop computer through a wired cable to receive and play a sound source signal from the electronic device.

Recently, with the development of wireless communication technology, the spread of wireless earphones (i.e., TWS earphones) connected to an electronic device through wireless communication rather than a wired cable to receive the sound source signal is rapidly increasing. A wireless earphone receives and plays a sound source signal through wireless communication such as Bluetooth classic audio, A2DP protocol, or Bluetooth low energy audio (BLE).

Early wireless earphones were developed in a structure in which a battery, a wireless communication module, and a speaker were integrally configured or left and right ear modules were connected by a wired cable. However, since the early wireless earphones are inconvenient to store due to a large size and inconvenient to wear due to the wired cable, miniaturized wireless earphones are being developed according to a market demand for seeking miniaturization.

Due to this trend, the wireless earphone includes a case, a first ear module, and a second ear module.

The first ear module and the second ear module are mounted in a case to charge a built-in battery and operated with power supplied from the built-in battery. The first ear module and the second ear module are classified into a master ear module and a sub ear module, in which the master ear module receives a sound source signal from an electronic device, and the sub ear module receives a sound source signal from the master ear module through wireless communication. Each of the first ear module and the second ear module may be formed as the master ear module to receive the sound source signal from the electronic device through wireless communication.

However, since the conventional wireless ear module is miniaturized and each module is separately formed, there is a problem in that a loss rate rapidly increases. Therefore, in the wireless ear module market, there is a demand for a function to easily check a location of the wireless ear module to prevent loss.

In addition, the conventional wireless ear module has a problem that a use time is limited because a small-capacity battery is mounted thereon. In order to increase the use time of the wireless ear module, it can be considered to apply a larger capacity battery to the wireless ear module. However, since the conventional wireless earphone has a limited mounting space, a mountable size of a battery is limited. Therefore, in the wireless ear module market, research and development are being conducted to increase the use time through a fast charging function.

SUMMARY OF INVENTION

Technical Problem

The present disclosure has been proposed in consideration of the above circumstances and is directed to providing a wireless ear module, which may have an ultra-wideband (UWB) antenna to easily check location information of a case of a wireless ear module and the ear module.

In addition, the present disclosure is directed to providing a wireless ear module, which may have a wireless power reception module to enable fast charging.

Solution to Problem

In order to achieve the objects, a wireless ear module according to a first embodiment of the present disclosure includes an ear module configured to receive and play a sound source signal from an electronic device, and a case composed of an upper housing and a lower housing rotatably coupled thereto to store the ear module, wherein at least one of the ear module and the case transmits a location positioning signal, and the location positioning signal is a signal capable of detecting a distance and a direction from the electronic device to the ear module or the case.

The case may include a first antenna configured to transmit the location positioning signal capable of detecting the distance and direction from the electronic device to the case, and the first antenna may be a first wireless communication chip mounted on a first main board of the case. In this case, the first antenna may further include a first antenna pattern formed on the first main board to output the location positioning signal in an ultra-wideband (UWB) frequency band.

The case may include a first antenna configured to transmit the location positioning signal capable of detecting the distance and direction from the electronic device to the case, and the first antenna may include a first antenna board having a first antenna pattern configured to output a location positioning signal in a UWB frequency band formed on a first surface to be mounted inside the case and spaced apart from a first main board mounted inside the case, and a first connector connecting a power supply of the first main board to the first antenna pattern. The first antenna may further include a second antenna pattern formed on the first antenna board and configured to transmit a signal in a frequency band different from that of the first antenna pattern, and a second connector connecting a power supply of the first main board to the second antenna pattern. The first antenna may further include a third antenna pattern formed on the first antenna board and configured to transmit a signal in a frequency band different from those of the first antenna pattern and the second antenna pattern, and a third connector connecting a power supply of the first main board to the third antenna pattern.

The case may further include a first adhesive sheet interposed between a second surface of the first antenna board and an inner surface of the case to bond the first antenna board to the case.

The ear module may include a second antenna configured to transmit the location positioning signal capable of detecting the distance and direction from the electronic device to the ear module, and the second antenna may be a wireless communication chip mounted on the second main board embedded in the ear module. The second antenna may further include a fourth antenna pattern formed on the second main board to output the location positioning signal in a UWB frequency band.

The ear module may include a second antenna configured to transmit the location positioning signal capable of detecting the distance and direction from the electronic device to the ear module, and the second antenna may include a second antenna board having a fourth antenna pattern configured to output a location positioning signal in a UWB frequency band formed on a first surface to be mounted inside the ear module and spaced apart from a second main board mounted inside the ear module, and a fourth connector connecting a power supply of the second main board to the fourth antenna pattern.

The second antenna may further include a fifth antenna pattern formed on the second antenna board and configured to transmit a signal in a frequency band different from that of the fourth antenna pattern, and a fifth connector connecting a power supply of the second main board to the fifth antenna pattern. The second antenna may further include a sixth antenna pattern formed on the second antenna board and configured to transmit a signal in a frequency band different from those of the fourth antenna pattern and the fifth antenna pattern, and a sixth connector connecting a power supply of the second main board to the sixth antenna pattern.

The ear module may further include a second adhesive sheet interposed between a first surface of the second antenna board and a housing of the ear module to bond the second antenna board to the ear module.

In order to achieve the objects, a wireless ear module according to a second embodiment of the present disclosure includes an ear module configured to receive and play a sound source signal from an electronic device, a case composed of an upper housing and a lower housing rotatably coupled thereto to store the ear module, and a wireless power reception module disposed inside the case, wherein the wireless power reception module includes a reception coil formed in a loop shape, and the reception coil is a Litz wire in which a plurality of wires are twisted.

The wireless ear module according to the second embodiment of the present disclosure may further include a main board disposed inside the case, and a battery disposed inside the case and disposed under the main board, wherein the wireless power reception module may be disposed under the battery.

The wireless power reception module may further include a magnetic base disposed under the battery and having a thickness of 170 μm or less, and the reception coil may be disposed on a first surface of the magnetic base.

The magnetic base may be a laminate in which a plurality of magnetic sheets are laminated, and the laminate may include at least one of an amorphous ribbon sheet, a nanocrystalline sheet, a ferrite sheet, and a polymer sheet.

A saturation magnetic flux density of the magnetic base may be 1 Tesla or more.

The reception coil may be a Litz wire in which a plurality of wires having a diameter of 0.5 mm or more and 0.7 mm or less are twisted, and a Litz wire in which a plurality of wires having a diameter of 0.6 mm are twisted.

Advantageous Effects of Invention

According to the present disclosure, the wireless ear module can have the UWB antenna embedded in the case and the ear module to accurately check the locations of the case and the ear module within a set radius (e.g., in a range of about 15 μm to 20 μm).

In addition, according to the wireless ear module, it is possible to accurately provide the locations of the case and the ear module to the user to provide departure warning service or the like using the location information, thereby preventing the loss of the miniaturized case and/or ear module.

In addition, according to the wireless ear module, it is possible to easily find the case and/or the ear module through the location information when the case and the ear module are lost.

In addition, since the wireless earphone has the reception coil formed of the Litz wire, it is possible to improve an alternating current (AC) reactor (ACR) and charging efficiency compared to the conventional one.

In addition, since the thickness of the wireless reception module of the wireless earphone is reduced by about 60 μm, it is possible to improve charging efficiency.

In addition, since the thickness of the wireless reception module of the wireless earphone is reduced, it is possible to improve the ACR compared to the conventional one and satisfy the Qi certification standard.

In addition, according to the wireless earphone, by compensating the manufacturing cost increased by having the reception coil formed of the Litz wire by decreasing the number of layers of the magnetic base, it is possible to prevent the increase in the manufacturing cost.

BRIEF DESCRIPTION OF DRAWINGS

FIG. 1 is a view for describing a wireless ear module according to a first embodiment of the present disclosure.

FIG. 2 is a view for describing a first embodiment of a case in FIG. 1.

FIG. 3 is a view for describing a modified example of the first embodiment of the case in FIG. 1.

FIG. 4 is a view for describing a second embodiment of the case in FIG. 1.

FIG. 5 is a view for describing an antenna board in FIG. 4.

FIG. 6 is a view for describing a modified example of the second embodiment of the case in FIG. 1.

FIG. 7 is a view for describing an antenna board in FIG. 6.

FIG. 8 is a view for describing another modified example of the first embodiment of the case in FIG. 1.

FIG. 9 is a view for describing an antenna board in FIG. 7.

FIG. 10 is a view for describing a first embodiment of an ear module in FIG. 1.

FIG. 11 is a view for describing a modified example of the ear module in FIG. 10.

FIG. 12 is a view for describing a second embodiment of the ear module in FIG. 1.

FIG. 13 is a view for describing a modified example of the ear module in FIG. 12.

FIG. 14 is a view for describing another modified example of the ear module in FIG. 12.

FIG. 15 is a view for describing a wireless ear module according to a second embodiment of the present disclosure.

FIG. 16 is a view for describing a wireless power reception module in FIG. 15.

FIG. 17 is a view illustrating a cross section of a reception coil along line A-A' in FIG. 15.

DESCRIPTION OF EMBODIMENTS

Hereinafter, the most preferred embodiment of the present disclosure will be described with reference to the accompanying drawings in order to describe the present disclosure in detail to the extent that those skilled in the art can easily carry out the technical spirit of the present disclosure. First, in adding reference numerals to components in each drawing, it should be noted that the same components have the same reference numerals as much as possible even when they are shown in different drawings. In addition, in describing embodiments of the present disclosure, when it is determined that the detailed description of related known configurations or functions may obscure the gist of the present disclosure, a detailed description thereof will be omitted.

Referring to FIG. 1, a wireless earphone 100 according to a first embodiment of the present disclosure includes a case 120, a first ear module 140, and a second ear module 160. Hereinafter, location information is not information including coordinates of a location of a transmission side, but refers to a positioning signal for identifying a location of the transmission side (the wireless earphone 100, the case 120, the first ear module 140, and the second ear module 160) at a reception side (i.e., an electronic device). In this case, the location information is a positioning signal capable of detecting a distance and a direction of the transmission side based on a location of the reception side and for example, is a positioning signal in a UWB frequency band.

The case 120 is configured so that an upper housing **120*a* and a lower housing 120*b* are rotatably coupled through a hinge. The case 120 is configured to open and close the upper housing 120*a* and the lower housing 120*b*** through the hinge.

The lower housing **120*b* of the case 120 has a connector for charging the first ear module 140 and the second ear module 160**, a main board, and the like embedded therein.

The case 120 has an antenna for providing location information of the case 120 embedded therein. The antenna may include an antenna chip mounted on the main board embedded in the case 120, an antenna pattern formed on the main board embedded in the case 120, an antenna board embedded in the case 120, etc.

For example, referring to FIG. 2, a first antenna may be formed of a first wireless communication chip 122 that is a UWB antenna in the form of a chip embedded in the case 120 to transmit a location information signal for providing location information of the case 120.

The first wireless communication chip 122 is mounted on a first main board 121 embedded in the case 120. In this case, structures such as a chip and a connector for controlling charging of the ear module 140 or 160 and the like are mounted on the first main board 121, and wires connecting the structures are formed thereon.

Wires for supplying power to and transmitting a signal to the first wireless communication chip 122 are additionally formed on the first main board 121, and the first wireless communication chip 122 is operated by receiving power through the corresponding wiring and transmits a signal corresponding to the location information of the case 120. Here, the first wireless communication chip 122 may transmit a UWB signal.

Referring to FIG. 3, a first antenna pattern 123 connected to the first wireless communication chip 122 may be formed on the first main board 121. In this case, the first antenna pattern 123 is operated by receiving power from the first wireless communication chip 122 to transmit a signal corresponding to the location information of the case 120. Here, the first antenna pattern 123 may transmit the UWB signal.

As another example, referring to FIGS. 4 and 5, the first antenna may be formed of a first antenna board 124 independently separated from the first main board 121 of the case 120.

The first antenna board 124 is embedded in the lower housing **120*b* of the case 120. The first antenna board 124 is mounted on an inner bottom surface of the lower housing 120*b*. The first antenna board 124** is formed in a plate shape having a first surface and a second surface facing the first surface.

A first adhesive sheet 125 is interposed between the second surface of the first antenna board 124 and the inner bottom surface of the lower housing **120*b*, and the first antenna board 124 is fixedly bonded to the inner bottom surface of the lower housing 120*b* by the first adhesive sheet 125**.

The first antenna pattern 123 is formed on the first surface of the first antenna board 124. The first antenna pattern 123 may be a radiation pattern for transmitting a signal in a UWB band.

Here, FIG. 5 illustrates a shape of a general radiation pattern for transmitting a signal in a UWB band, but the present disclosure is not limited thereto, and the radiation pattern may be modified in various forms according to required frequency characteristics, an internal structure of the case 120, etc.

The first antenna board 124 may be connected to the first main board 121 through a first connector **126*a*. The first connector 126*a* connects the first antenna pattern 123 formed on the first antenna board 124 to a power supply of the first main board 121**.

Here, FIG. 4 illustrates that the first connector **126*a* is formed of a C clip, but the present disclosure is not limited thereto, and the first connector 126*a* may be replaced with a base that electrically connects the first antenna pattern 123 to the first main board 121 to stably supply power to the first antenna pattern 123**.

Referring to FIGS. 6 and 7, a second antenna pattern 127 for low-power short-range communication may be further formed on the first antenna board 124. The second antenna pattern 127 is, for example, Bluetooth low energy (BLE), which is a low power model of Bluetooth communication.

The second antenna pattern 127 is formed on the first surface of the first antenna board 124 and disposed to be spaced by a predetermined distance from the first antenna pattern 123 to prevent interference with the first antenna pattern 123. In this case, a part of the second antenna pattern 127 may be formed on the first surface of the first antenna board 124, and the other part thereof may be formed on the second surface of the first antenna board 124.

The second antenna pattern 127 may further include wirings and patterns for supplying power together with a pattern for transmitting a BLE signal. In this case, the second antenna pattern 127 is operated by receiving power through a second connector **126*b*, and the second connector 126*b* is, for example, a C clip different from that of the first connector 126*a***.

Referring to FIGS. 8 and 9, a third antenna pattern 128 may be further formed on the first antenna board 124. The third antenna pattern 128 is, for example, an antenna for transmitting a Wi-Fi frequency signal.

The third antenna pattern 128 is formed on the first surface of the first antenna board 124 and disposed to be spaced by a predetermined distance from the first antenna pattern 123 and the second antenna pattern 127. In this case, the third antenna pattern 128 may further include wirings and patterns for supplying power together with a pattern for transmitting a Wi-Fi signal. In this case, the third antenna is operated by receiving power through a third connector **126*c*, and the third connector 126*c* is, for example, a C clip different from those of the first connector 126*a* and the second connector 126*b***.

Meanwhile, due to the miniaturization of the wireless earphone 100, the main board mounted on the case 120 is also inevitably miniaturized, and therefore, a space for mounting a chip or forming a radiation pattern is insufficient. Therefore, when the first antenna is formed in the form of a chip or in the form of a pattern on the first main board 121, performance of the antenna is inevitably degraded relatively, and the wireless earphone 100 according to the first embodiment of the present disclosure forms a radiation pattern for location information on the first antenna board 124 independent of the first main board 121, thereby improving antenna performance.

The first ear module 140 and the second ear module 160 are connected to the electronic device 10 through short-range communication such as Bluetooth communication and receive and play a sound source signal from the electronic device 10. The first ear module 140 and the second ear module 160 are operated through a built-in battery, and the built-in battery is charged in a state in which the first ear module 140 and/or the second ear module 160 are mounted on the case 120. Here, the first ear module 140 and the second ear module 160 are formed as the master ear module 140 or 160 and the sub ear module 140 or 160 or all formed as the master ear modules 140 and 160.

The first ear module 140 and the second ear module 160 have antennas for providing location information of the ear modules 140 and 160 embedded therein. The antenna may include an antenna chip mounted on the main board of the ear module 140 or 160, an antenna pattern formed on the main board of the ear module 140 or 160, and an antenna board embedded in the ear modules 140 or 160.

Referring to FIG. 10, the second antenna may be formed of a second wireless communication chip 142 or 162 that is a UWB antenna in the form of a chip embedded in the ear module (i.e., the first ear module 140 and/or the second ear module 160) to transmit the location information signal for providing the location information of the ear module 140 or 160.

The second wireless communication chip 142 or 162 is mounted on the second main board 141 or 161 embedded in the ear module 140 or 160. In this case, structures such as a communication chip and a connector for communication between the ear modules 140 and 160 and/or between the ear module 140 or 160 and the electronic device 10 are mounted on the second main board 141 or 161, and wirings connecting the structures are formed.

Wires for supplying power to and transmitting a signal to the second wireless communication chip 142 or 162 are additionally formed on the second main board 141 or 161, and the second wireless communication chip 142 or 162 is operated by receiving power through the corresponding wiring and transmits a signal corresponding to the location information of the ear module 140 or 160. Here, the second wireless communication chip 142 or 162 may transmit a UWB signal.

Referring to FIG. 11, a fourth antenna pattern 143 or 163 connected to the second wireless communication chip 142 or 162 may be formed on the second main board 141 or 161. In this case, the fourth antenna pattern 143 or 163 is operated by receiving power from the second wireless communication chip 142 or 162 to transmit a signal corresponding to the location information of the ear module 140 or 160. Here, the fourth antenna pattern 143 or 163 may transmit the UWB signal.

Referring to FIG. 12, the second antenna may be formed of a second antenna board 144 or 164 independently separated from the second main board 141 or 161 of the ear module 140 or 160.

The second antenna board 144 or 164 is embedded in a housing of the ear module 140 or 160. The housing of the ear module 140 or 160 may be composed of an upper housing **140*a* or 160*a* and a lower housing 140*b* or 160*b*, and the second antenna board 144 or 164 is mounted on an inner bottom surface of the upper housing 140*a* or 160*a* of the ear module 140 or 160. The second antenna board 144 or 164** is formed in a plate shape having a first surface and a second surface facing the first surface.

A second adhesive sheet 145 or 165 is interposed between the first surface of the second antenna board 144 or 164 and the inner bottom surface of the upper housing **140*a* or 160*a*, and the second antenna board 144 or 164 is fixedly bonded to the inner bottom surface of the upper housing 140*a* or 160*a* by the second adhesive sheet 145 or 165**.

The fourth antenna pattern 143 or 163 is formed on the second surface of the second antenna board 144 or 164. The fourth antenna pattern 143 or 163 may be a radiation pattern for transmitting a signal in a UWB band. Here, a shape of the fourth antenna pattern 143 or 163 may be transformed into various shapes according to frequency characteristics, an internal structure of the case 120, etc.

The second antenna board 144 or 164 may be connected to the second main board 141 or 161 through a fourth connector **146*a* or 166*a*. The fourth connector 146*a* or 166*a* connects the fourth antenna pattern 143 or 163 formed on the second antenna board 144 or 164 to a power supply of the second main board 141 or 161**.

Here, FIG. 12 illustrates that the fourth connector **146*a* or 166*a* is formed of a C clip, but the present disclosure is not limited thereto, and the fourth connector 146*a* or 166*a* may be replaced with a base that electrically connects the second main board 141 or 161 to the fourth antenna pattern 143 or 163 to stably supply power to the fourth antenna pattern 143 or 163**.

Referring to FIG. 13, a fifth antenna pattern (not illustrated) for low-power short-range communication may be further formed on the second antenna board 144 or 164. The fifth antenna pattern is, for example, Bluetooth low energy (BLE), which is a low power model of Bluetooth communication.

The fifth antenna pattern is formed on the second surface of the second antenna board 144 or 164 and disposed to be spaced by a predetermined distance from the fourth antenna pattern 143 or 163 to prevent interference with the fourth antenna pattern 143 or 163. In this case, a part of the fifth antenna pattern may be formed on the second surface of the second antenna board 144 or 164, and the other part thereof may be formed on the first surface of the second antenna board 144 or 164.

The fifth antenna pattern may further include wirings and patterns for supplying power together with a pattern for transmitting a BLE signal. In this case, the fifth antenna pattern is operated by receiving power through a fifth connector **146*b* or 166*b*, and the fifth connector 146*b* or 166*b* is, for example, a C clip different from that of the fourth connector 146*a* or 166*a***.

Referring to FIG. 14, a sixth antenna pattern (not illustrated) may be further formed on the second antenna board 144 or 164. The sixth antenna pattern is, for example, an antenna for transmitting a Wi-Fi frequency signal.

The sixth antenna pattern is formed on the second surface of the second antenna board 144 or 164 and disposed to be spaced by a predetermined distance from the fourth antenna pattern 143 or 163 and the fifth antenna pattern. In this case, the sixth antenna pattern may further include wirings and patterns for supplying power together with a pattern for transmitting a Wi-Fi signal. In this case, the sixth antenna pattern is operated by receiving power through a sixth connector 146*c* or 166*c*, and the sixth connector 146*c* or 166*c* is, for example, a C clip different from those of the fourth connector 146*a* or 166*a* and the fifth connector 146*b* or 166*b*.

Meanwhile, since the ear module 140 or 160 of the wireless earphone 100 is worn on a user's ears, the ear module 140 or 160 is inevitably miniaturized, and thus, a space for mounting a chip or forming a radiation pattern is insufficient. Therefore, when the second antenna is formed in the form of a chip or in the form of a pattern on the second main board 141 or 161, performance of the antenna is inevitably degraded relatively, and the wireless earphone 100 according to the first embodiment of the present disclosure forms a radiation pattern for location information on the second antenna board 144 or 164 independent of the second main board 141 or 161, thereby improving antenna performance of the ear module 140 or 160.

It has been described above that the location information of the case 120, the first ear module 140, and the second ear module 160 are transmitted, but the present disclosure is not limited thereto, and the location information signal including a device name, a device identification number, etc. may be transmitted.

Meanwhile, in recent years, there is a need for a high-speed wireless charging function of a wireless earphone from the market and consumers. In order to support fast wireless charging, it is required to increase a saturation magnetic flux density of a shielding sheet to minimize the influence of a magnetic field generated during wireless power transmission and reception and decrease a resistance of a coil for wireless power transmission and reception.

Therefore, a wireless earphone according to a second embodiment of the present disclosure has a wireless power reception module, which includes a magnetic base having a thickness of about 170 μm or less and having a saturation magnetic flux density of about 1 Tesla or more and a reception coil formed of a Litz wire, embedded in a case. Therefore, the wireless earphone can reduce the resistance due to an increase in a surface area of the reception coil compared to the conventional one formed of a single wire while minimizing the influence of the magnetic field.

Referring to FIG. 15, a case 220 has a main board 221, a battery 222, and a wireless power reception module 223 embedded therein. In this case, the case 220 is composed of an upper housing 220*a* and a lower housing 220*b*, and the main board 221, the battery 222, and the wireless power reception module 223 are, for example, embedded in the lower housing 220*b* of the case 220.

The main board 221 is embedded in the case 220. A first circuit for controlling charging of the first ear module and the second ear module is formed on the main board 221. A second circuit for controlling charging and discharging of the battery 222 and an operation of the wireless earphone is formed on the main board 221. In this case, the first circuit and the second circuit may be formed as one circuit.

The battery 222 is disposed under the main board 221. The battery 222 is charged with wireless power received by the wireless power reception module 223. The battery 222 supplies power for charging the first ear module and the second ear module stored in the case 220.

The wireless power reception module 223 is disposed under the main board 221. The wireless power reception module 223 is disposed between the main board 221 and/or the battery 222 and a lower cover of the case 220. The wireless power reception module 223 is configured to receive wireless power wirelessly transmitted from an external charger to charge the battery 222.

Referring to FIG. 16, the wireless power reception module 223 includes a reception coil 224 and a magnetic base 225.

The reception coil 224 is disposed on one surface of the magnetic base 225. The reception coil 224 is disposed on a lower surface of the magnetic base 225, and the lower surface of the magnetic base 225 is, for example, one surface of the magnetic base 225 disposed toward the lower cover of the case 220.

The reception coil 224 is formed of a Litz wire, which is a conductive wire in which a plurality of wires are twisted to decrease a resistance. The reception coil 224 is formed of a conductive wire in which a plurality of wires having a diameter in a set range are twisted. In this case, the set range of the diameter of the reception coil 224 is, for example, about 0.05 mm or more and 0.07 mm or less.

Referring to FIG. 17, the reception coil 224 is, for example, a conductive wire in which 34 wires 224*a* having a diameter of about 0.06 mm are twisted. Therefore, a surface area of the reception coil 224 is increased compared to the conventional one formed of a single wire having a diameter of about 0.3 mm, thereby decreasing a resistance of the reception coil 224.

In the wireless earphone according to the second embodiment of the present disclosure, since the reception coil 224 is formed of the Litz wire, it is possible to improve the ACR by about 100 mΩ compared to the conventional one formed of the single wire having a diameter of about 0.3 mm and improve charging efficiency by about 2%.

The magnetic base 225 is a shielding base for shielding a magnetic field generated during wireless power transmission/reception or wireless charging. The magnetic base 225 is formed of a magnetic body and may be a plate-shaped sheet having a predetermined area.

The magnetic base 225 may be a magnetic body formed of an amorphous ribbon sheet. The amorphous sheet is, for example, a ribbon sheet containing Fe, Si, and B or a ribbon sheet containing Fe, Si, and Nb. The amorphous sheet may be a ribbon sheet containing Fe, Si, B, Cu, and Nb. The magnetic base 225 may be a magnetic body formed of a nano-crystalline grain sheet including a nano-crystalline alloy.

The magnetic base 225 may be formed of a magnetic laminate in which a plurality of amorphous ribbon sheets and/or nano-crystalline grain sheets are laminated. In this case, the magnetic base 225 may be formed of a magnetic laminate in which only amorphous ribbon sheets are laminated, a magnetic laminate in which only nano-crystalline grain sheets are laminated, and a magnetic laminate in which amorphous ribbon sheets and nano-crystalline grain sheets are mixed and laminated.

The magnetic base 225 may be formed of a magnetic sheet such as a ferrite sheet or a polymer sheet. The magnetic base 225 may also be formed of a magnetic laminate in which a plurality of magnetic sheets are laminated. In this case, the magnetic base 225 may be formed of a magnetic laminate in which magnetic sheets of the same type or different types are laminated. Here, the magnetic base 225 may be formed of a magnetic laminate in which only ferrite sheets are laminated, a magnetic laminate in which only polymer sheets are laminated, and a magnetic laminate in which the ferrite sheets and the polymer sheets are mixed and laminated. Of course, the magnetic base 225 may be formed of a magnetic sheet made of a material other than ferrite and polymer.

Since the case 220 has a limited accommodation space, a thickness of the magnetic base 225 needs to decrease when a thickness of the reception coil 224 increases.

Therefore, the magnetic base 225 may be formed of a magnetic laminate having about 5 layers in which two layers are omitted from the conventional one formed of about 7 layers. In this case, the magnetic base 225 is formed of a magnetic body having a thickness of about 170 μm or less and having a saturation magnetic flux density of about 1 Tesla or more to minimize the influence of the magnetic field during fast wireless charging.

Therefore, according to the wireless earphone according to the second embodiment of the present disclosure, it is possible to improve charging efficiency by about 1% while decreasing the thickness of the wireless reception module by about 60 μm.

In addition, according to the wireless earphone according to the second embodiment of the present disclosure, it is possible to improve the ACR by about 100 mΩ compared to the conventional one while decreasing the thickness of the wireless reception module by about 60 μm.

In addition, according to the wireless earphone according to the second embodiment of the present disclosure, it is possible to satisfy the Qi certification standard while decreasing the thickness of the wireless reception module.

In addition, according to the wireless earphone according to the embodiment of the present disclosure, by compensating the manufacturing cost increased by the reception coil 224 formed of the Litz wire by decreasing the number of layers of the magnetic base, it is possible to prevent the increase in the manufacturing cost. Although the preferred embodiments of the present disclosure have been described, it is understood to those skilled in the art that the present disclosure can be modified into various forms, and various modified examples and changed examples can be carried out without departing from the claims of the present disclosure.

The invention claimed is:

1. A wireless ear module comprising:

an ear module configured to receive and play a sound source signal from an electronic device; and a case composed of an upper housing and a lower housing rotatably coupled thereto to store the ear module, wherein at least one of the ear module and the case transmits a location positioning signal, and the location positioning signal is a signal capable of detecting a distance and a direction from the electronic device to the ear module or the case, wherein the case includes a first antenna configured to transmit the location positioning signal capable of detecting the distance and direction from the electronic device to the case, and wherein the first antenna includes:

a first antenna board having a first antenna pattern configured to output a location positioning signal in a UWB frequency band formed on a first surface to be mounted inside the case and spaced apart from a first main board mounted inside the case; and a first connector connecting a power supply of the first main board to the first antenna pattern.

2. The wireless ear module of claim 1, wherein the case includes a first antenna configured to transmit the location positioning signal capable of detecting the distance and direction from the electronic device to the case, and the first antenna is a first wireless communication chip mounted on a first main board of the case.

3. The wireless ear module of claim 2, wherein the first antenna further includes a first antenna pattern formed on the first main board to output the location positioning signal in an ultra-wideband (UWB) frequency band.

4. The wireless ear module of claim 1, wherein the first antenna further includes:

a second antenna pattern formed on the first antenna board and configured to transmit a signal in a frequency band different from that of the first antenna pattern; and a second connector connecting a power supply of the first main board to the second antenna pattern.

5. The wireless ear module of claim 4, wherein the first antenna further includes:

a third antenna pattern formed on the first antenna board and configured to transmit a signal in a frequency band different from those of the first antenna pattern and the second antenna pattern; and a third connector connecting a power supply of the first main board to the third antenna pattern.

6. The wireless ear module of claim 1, wherein the case further includes a first adhesive sheet interposed between a second surface of the first antenna board and an inner surface of the case to bond the first antenna board to the case.

7. The wireless ear module of claim 1, wherein the ear module includes a second antenna configured to transmit the location positioning signal capable of detecting the distance and direction from the electronic device to the ear module, and the second antenna is a wireless communication chip mounted on the second main board embedded in the ear module.

8. The wireless ear module of claim 7, wherein the second antenna further includes a fourth antenna pattern formed on the second main board to output the location positioning signal in a UWB frequency band.

9. The wireless ear module of claim 1, wherein the ear module includes a second antenna configured to transmit the location positioning signal capable of detecting the distance and direction from the electronic device to the ear module, and the second antenna includes:

a second antenna board having a fourth antenna pattern configured to output a location positioning signal in a UWB frequency band formed on a first surface to be mounted inside the ear module and spaced apart from a second main board mounted inside the ear module; and a fourth connector connecting a power supply of the second main board to the fourth antenna pattern.

10. The wireless ear module of claim 9, wherein the second antenna further includes:

a fifth antenna pattern formed on the second antenna board and configured to transmit a signal in a frequency band different from that of the fourth antenna pattern; and a fifth connector connecting a power supply of the second main board to the fifth antenna pattern.

11. The wireless ear module of claim 10, wherein the second antenna further includes:

a sixth antenna pattern formed on the second antenna board and configured to transmit a signal in a frequency band different from those of the fourth antenna pattern and the fifth antenna pattern; and a sixth connector connecting a power supply of the second main board to the sixth antenna pattern.

12. The wireless ear module of claim 9, wherein the ear module further includes a second adhesive sheet interposed between a first surface of the second antenna board and a housing of the ear module to bond the second antenna board to the ear module.

* * * * *